(12) United States Patent
Giavani et al.

(10) Patent No.: US 12,359,873 B2
(45) Date of Patent: Jul. 15, 2025

(54) PROCESS AND PLANT FOR PREHEATING A METAL CHARGE FED IN CONTINUOUS TO AN ELECTRIC MELTING FURNACE

(71) Applicant: Tenova S.p.A., Milan (IT)

(72) Inventors: Cesare Giavani, Milan (IT); Silvio Maria Reali, Milan (IT)

(*) Notice: Subject to any disclaimer, the term of this patent is extended or adjusted under 35 U.S.C. 154(b) by 299 days.

(21) Appl. No.: 17/758,367

(22) PCT Filed: Dec. 14, 2020

(86) PCT No.: PCT/IB2020/061879
§ 371 (c)(1),
(2) Date: Jul. 5, 2022

(87) PCT Pub. No.: WO2021/144637
PCT Pub. Date: Jul. 22, 2021

(65) Prior Publication Data
US 2023/0032262 A1 Feb. 2, 2023

(30) Foreign Application Priority Data

Jan. 17, 2020 (IT) .................. 102020000000793

(51) Int. Cl.
*F27D 13/00* (2006.01)
*F23C 7/00* (2006.01)
(Continued)

(52) U.S. Cl.
CPC ............ *F27D 17/304* (2025.01); *F23C 7/008* (2013.01); *F23N 3/002* (2013.01); *F27B 3/18* (2013.01);
(Continued)

(58) Field of Classification Search
CPC ...... C21C 5/565; F27B 9/12; F27B 2009/112; F27B 3/18; F27D 11/00; F27D 11/08; F27D 13/002
See application file for complete search history.

(56) References Cited

U.S. PATENT DOCUMENTS 4,609,400 A * 9/1986 Vallomy .................. F27B 3/19
 75/10.63
5,400,358 A * 3/1995 Vallomy ............... F27D 17/003
 75/10.63
(Continued)

FOREIGN PATENT DOCUMENTS

EP 0744585 A1 * 11/1996

*Primary Examiner* — Gregory A Wilson
(74) *Attorney, Agent, or Firm* — Themis Law; Franco A. Serafini

(57) ABSTRACT

A process and plant for preheating a metal charge fed in continuous to an electric melting furnace through a preheating tunnel provided with side walls, a vault and a horizontal conveyor, wherein the metal charge is enveloped in countercurrent by fumes or exhaust gases exiting from the electric melting furnace, includes causing an air intake from the surrounding environment through openings along the preheating tunnel to complete the combustion of the fumes or exhaust gases. The intake is regulated by acting on suction fans and/or on the openings, based on measurements by temperature sensors and/or the composition of the outgoing gases in or downstream of the terminal part of the tunnel. The metal charge is enveloped by jets of gas ejected through a plurality of nozzles arranged non-uniformly longitudinally on the vault of the tunnel, with a greater concentration on the top of the vault of the tunnel.

14 Claims, 9 Drawing Sheets

(51) Int. Cl.
  *F23N 3/00*    (2006.01)
  *F27B 3/18*    (2006.01)
  *F27D 17/30*   (2025.01)
  *F27D 3/00*    (2006.01)

(52) U.S. Cl.
  CPC ........ *F27D 13/002* (2013.01); *F23N 2225/08* (2020.01); *F23N 2900/00* (2013.01); *F27D 2003/0038* (2013.01)

(56) References Cited

U.S. PATENT DOCUMENTS

| | | | | |
|---|---|---|---|---|
| 7,648,551 | B2* | 1/2010 | Sellan | F27D 17/003 |
| | | | | 75/382 |
| 9,677,814 | B2* | 6/2017 | Giavani | F27D 3/003 |
| 10,584,394 | B2* | 3/2020 | Ansoldi | F27D 17/002 |
| 10,989,475 | B2* | 4/2021 | Shver | H05B 7/20 |
| 11,702,713 | B2* | 7/2023 | Reali | F27D 17/002 |
| | | | | 266/44 |
| 2007/0101821 | A1* | 5/2007 | Sellan | F27D 3/0033 |
| | | | | 266/88 |

* cited by examiner

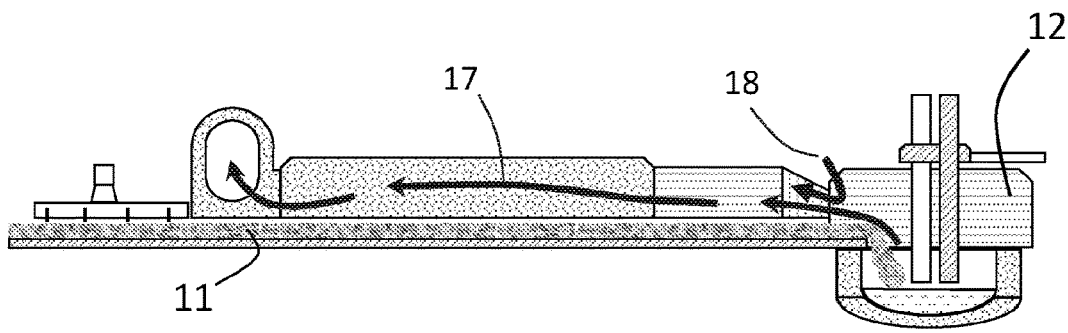
PRIOR ART  Fig. 1
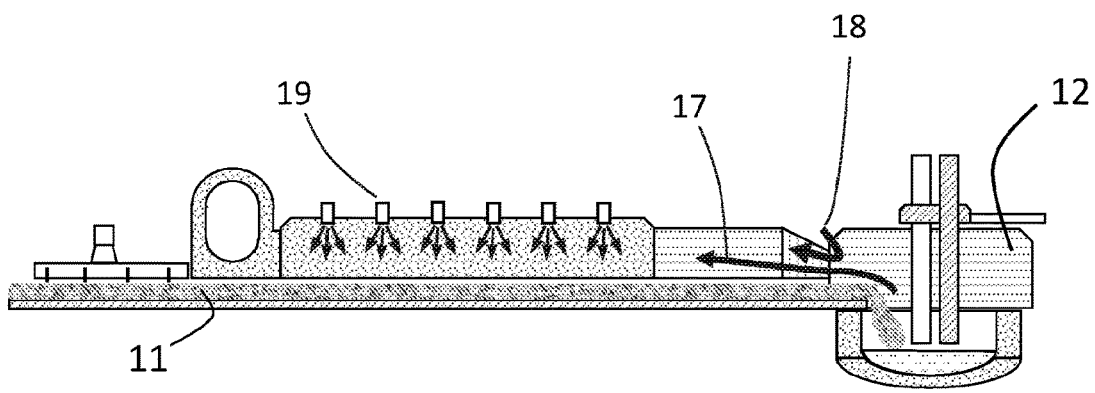
PRIOR ART  Fig. 2
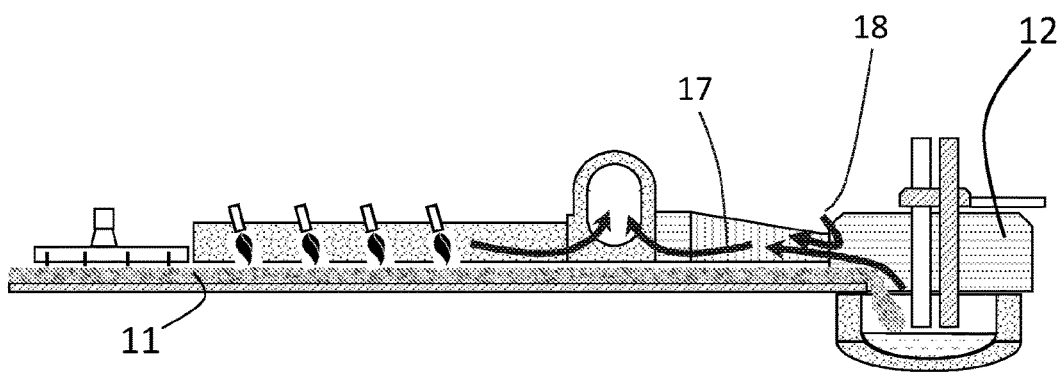
PRIOR ART  Fig. 3

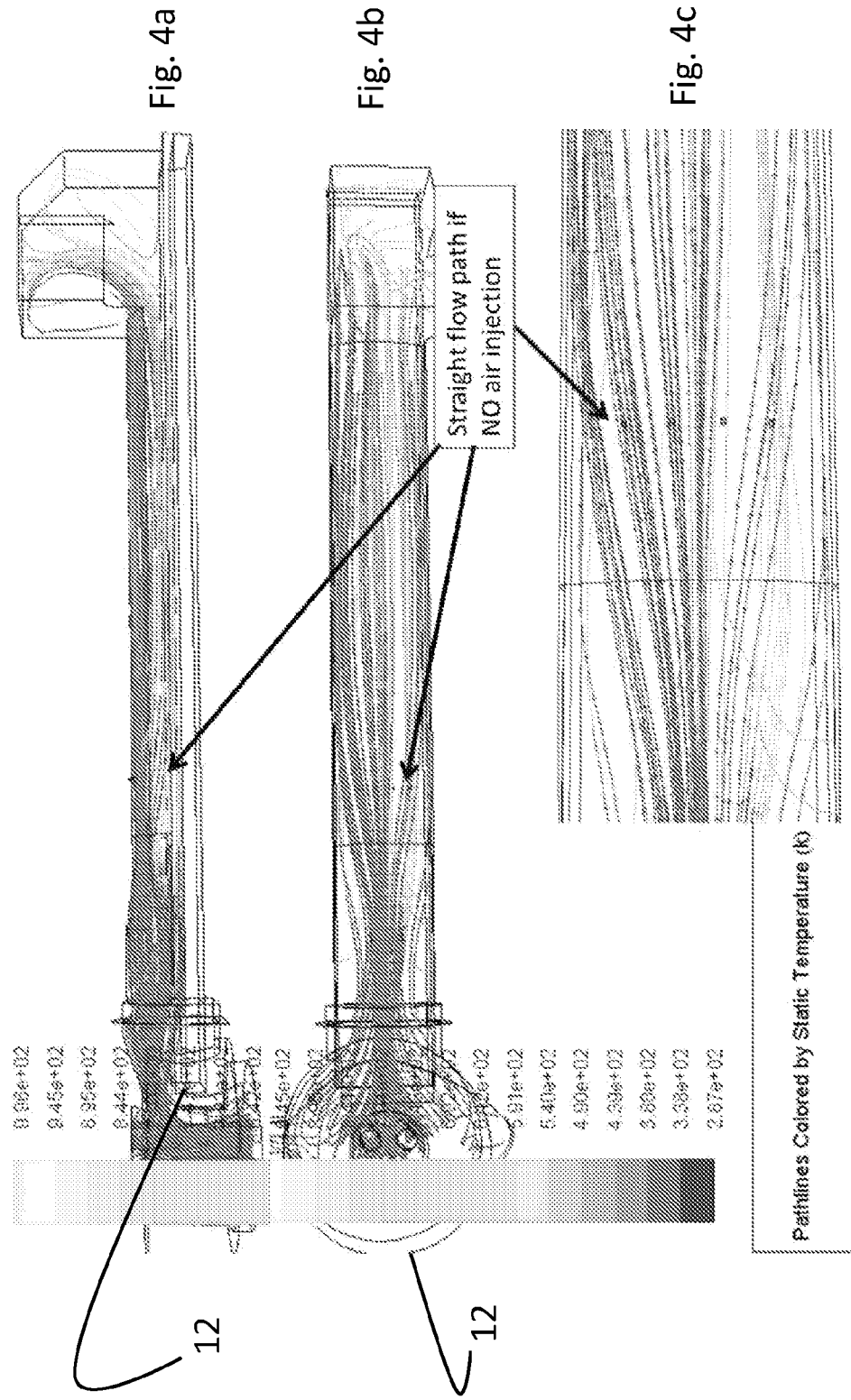

PROCESS AND PLANT FOR PREHEATING A METAL CHARGE FED IN CONTINUOUS TO AN ELECTRIC MELTING FURNACE

The present invention relates to an improved process for preheating metal charge material continuously fed to an electric furnace for the production of molten metal.

The invention also relates to a plant for implementing said process.

A process and a plant for preheating a metal charge (generally scrap) are well known to persons skilled in the field, wherein said charge is continuously fed to an electric melting furnace by means of a horizontal conveyor; said pre-heating process favours the subsequent melting process.

The preheating of the charge takes place in the passage inside a tunnel in which the sensible heat and combustion heat of the exhaust gases of the smelting process itself (in some particular cases the preheating could also be favoured by appropriate auxiliary burners) are exploited. The exhausted fumes are then evacuated from the preheating tunnel and sent to a suitable treatment system for the same. The combustion heat that is exploited in the preheating process is essentially that provided by the completion of the combustion of the CO (carbon monoxide) and $H_2$ (hydrogen) released by the process taking place in the melting furnace, whereas the necessary oxygen is generally supplied with the supply of ambient air.

A process and a plant such as those briefly described above are for example the subject of U.S. Pat. No. 5,400,358, which describes the injection of the air necessary for uniform combustion along the preheating tunnel. This solution teaches the injection of air distributed along the preheating tunnel in a quantity such as to guarantee an excess of oxygen in the order of 3-5% in order to ensure the complete combustion of the unburned gases, assuming in fact that the seal between the furnace and the tunnel is almost perfect. In plant engineering, it has been seen that this situation cannot be obtained and there are always significant infiltrations of external air (in particular in the interface area between the furnace and the tunnel), often to an extent that is already more than sufficient for ensuring complete combustion of the process gas coming from the furnace; it has also been observed that these air infiltrations are not able to achieve sufficient turbulence conditions, this air in fact tends to follow the internal walls of the heating tunnel and the mixing and combustion with the process gases take place slowly. An excess of ambient air supply inside the preheating tunnel must be absolutely avoided as it would lower the gas temperature too much, and if this temperature reached a value very close or even lower than the CO ignition limit, there would be the risk of not being able to complete its combustion with the consequent release of this toxic gas into the environment, in addition to the significant loss of efficiency of the preheating system of the charge.

Within the context of the technical solution described above, the air injectable from the vault is consequently extremely low if not zero, which aggravates the problem resulting from the low turbulence, and thus effectively preventing the optimal exploitation of the energy available inside the preheating tunnel.

The general objective of the present invention is to overcome the drawbacks of the known art and, in view of this objective, according to the invention, to improve the exploitation of the energy present in the fumes for heating the charge.

More specifically, the objective of the present invention is to increase the heat exchange between the hot process fumes and the metal charge.

The above objectives are achieved by a process and a plant produced according to the enclosed independent claims and sub-claims.

Thanks to the present invention, the heat exchange between the hot process fumes and the metal charge is increased by increasing the turbulence and mixing the gas stream inside the preheating tunnel, with a consequent acceleration of the combustion processes and an increase in the convective heat exchange coefficients between said combustion gases and the charge material.

This effect is obtained with high-speed gas jets; the gas used is generally air, but the possibility of using another gas is not excluded, should it be needed for managing the chemical composition of the atmosphere inside the preheating tunnel; this gas can also be advantageously preheated.

In particular, the present invention relates to a process and a plant for preheating a metal charge fed continuously to an electric melting furnace through a preheating tunnel equipped with a horizontal conveyor, wherein said metal charge is enveloped in counter-current by the fumes or exhaust gases exiting from said electric melting furnace (rich in carbon monoxide and other combustible gases that need to be completely oxidized before being treated in the fume system and released into the atmosphere, in order to avoid the risk of explosions) and from jets of gases ejected through a plurality of nozzles arranged on the vault of said tunnel provided with side walls and said vault.

Said nozzles are arranged in interspaced groups in a longitudinal direction with respect to the tunnel, and generate a small-scale turbulence, i.e. they inject small fast jets of gas capable of penetrating the stream, and said nozzles simultaneously generate a "horseshoe vortex" structure, consisting of a central descending gas flow ("downwash"), and ascending flows ("upwash") close to the side walls of the preheating tunnel which allow the necessary gas circulation.

More specifically, the present invention relates to a process for preheating a metal charge fed continuously to an electric melting furnace through a preheating tunnel provided with side walls, a vault and a horizontal conveyor, wherein said metal charge is enveloped in counter-current by the fumes or exhaust gases exiting from said electric melting furnace, said process being characterized in that the intake of air for completing the combustion of said fumes or exhaust gases (17) is effected from the surrounding environment through openings along the preheating tunnel, preferably openings present at the interface between said preheating tunnel and said electric melting furnace, said intake being regulated by acting on suction fans and/or on said openings, on the basis of measurements detected by temperature and/or composition sensors (21) of the outgoing gases positioned in the terminal part of said tunnel (16) or downstream of said part;

the metal charge is struck by gas jets ejected through a plurality of nozzles (15) arranged on the vault of said tunnel (16), the jets of gas introduced by said nozzles (15) being non-uniformly distributed transversely on the vault of the preheating tunnel (16), with a higher concentration on the roof of the vault of said tunnel (16) and the gas jets being non-uniformly distributed longitudinally along said preheating tunnel (16), transversal sections being provided along which said nozzles (15) are distributed, interspersed with longitudinal sections of tunnel (16) without said nozzles (15) so as to avoid interference phenomena.

According to the present invention, said nozzles are arranged in groups, in each of which the nozzles are aligned in correspondence with certain transversal sections of the roof of the tunnel, suitably spaced apart. This allows a small-scale turbulence and simultaneously a large-scale vortex structure to be generated: the former corresponds to the fact that the small fast jets of gas are able to penetrate the main gas stream passing through the tunnel, considerably accelerating the mixing and combustion of the gases; the large-scale vortex structure, which increases the heat exchange between fumes and charge, is commonly defined a "horseshoe vortex" and is characterized by a descending central flow ("downwash"), which increases the heat exchange in the centre of the preheating tunnel, and ascending flows ("upwash") close to the side walls of the tunnel which allow the necessary circulation of the gases, and which, after yielding part of their heat energy to the metal charge in the descending phase, limit the heat exchange with the side walls of the tunnel and horizontal conveyor.

Unlike what is present in the known art, the above-mentioned gas jets are not arranged uniformly along the preheating tunnel but are rather arranged in groups, at least two, suitably interspaced; this is to avoid interference of a fluid-dynamic nature and to allow, first of all, a good mixing of the gases and a rapid development of the combustion (with a small-scale turbulence effect) and subsequently pushing them towards the metal charge (with the "horseshoe vortex" effect).

Contrary to what is present in the known art, the nozzles are not dimensioned for supplying all the combustion air in a distributed and uniform mode, but, on the other hand, are dimensioned for being capable of supplying small fast jets whose primary function is to supply kinetic energy and modify the field of motion according to what is described above; for this reason, the above-mentioned jets can be more accurately defined as "fluid-dynamic turbulence generators" or more simply, "fluid-dynamic turbulators".

More specifically, the combustion air necessary for the complete oxidation of the gases emitted from the furnace is sucked from the surrounding environment through openings along the preheating tunnel, such as for example the connection area of the preheating tunnel in the furnace or interface between the tunnel and furnace, the side edges of the conveyor, etc. In other words, the fume extraction plant is regulated so that the air entering from the surrounding environment through the openings along the preheating tunnel is sufficient for guaranteeing the complete combustion of the gases leaving the electric furnace, in particular carbon monoxide (CO); this condition is verified by measuring various parameters of the fumes in the terminal area of the preheating tunnel, such as the temperature, which must be above a certain threshold, for example 700° C., and the composition of the gases, which, in order to guarantee the total absence of CO, must have an oxygen content above a certain threshold, for example 5% by volume. The regulation of the suction plant can be effected for example by acting on the suction fans of the fumes, and/or on the openings through which the combustion air from the surrounding environment is sucked, such as for example the opening present in the movable end section of the preheating tunnel (called "connecting car"), which introduces the scrap into the EAF electric melting furnace, is inserted into the furnace itself, i.e. at the interface between the preheating tunnel and the electric melting furnace: this opening can in fact be easily changed by modifying the position of the connecting car with respect to the furnace.

The air/gas injected/or through the nozzles, on the other hand, has only marginal (or no) importance in the chemical balance of the gas combustion reactions from the electric furnace, whereas it has a fluid-dynamic function of increasing turbulence and mixing the fluid flow passing through the preheating tunnel, in order to increase and improve the heat exchange with the charge material. From this point of view, the dimensioning of the injection plant from the nozzles is not effected with chemical balance criteria, but with purely fluid-dynamic criteria based on the impulse of the air jet with respect to the impulse of the fluid flow in the preheating tunnel, described hereunder.

The use of "fluid-dynamic turbulators" is much simpler and more convenient than the alternative solution that provides for increasing the turbulence inside the preheating tunnel by the insertion of deflector panels, or so-called "static turbulators"; these deflectors must operate within a flow of high-temperature gas and dustiness and they are therefore normally produced as water-cooled metal panels, which is not an efficient solution from a thermal point of view; whatever solution these deflector panels may provide, their use has been practically abandoned due to their rapid wear and frequent breakages.

The known art does not take into consideration the fact that in an operational reality, there is always a significant infiltration of environmental air inside the preheating tunnel of the charge through the inevitable openings, and that the quantity of combustion air is variable during the process, whereas there is a substantially constant need for a good mixing.

The advantage offered by the present invention is therefore evident, whereby the operation of jets for controlling the turbulence inside the preheating tunnel is substantially decoupled from the control of the supply of any possible combustion air.

The structural and functional characteristics of the invention and its advantages with respect to the known art will appear more evident from the following description, referring to the attached drawings, which illustrate a possible non-limiting embodiment example of the invention itself applied to an electric arc furnace (EAF) for melting metal scrap charged in continuous.

In the drawings:

FIG. 1 illustrates a plant according to the known art;

FIG. 2 illustrates a plant according to the known art provided with combustion air injectors uniformly distributed along the preheating tunnel;

FIG. 3 illustrates a plant according to the known art provided with a preheating section with burners and a heating section by means of off-gas connected by a suction/evacuation section of the fumes;

FIGS. 4a, 4b and 4c show, with a side view (4a) and views from above (4b and 4c), the flow of gases in the preheating tunnel of a plant produced according to the known art without high-speed air jets, in particular the view from above in FIG. 4c shows the absence of turbulence in correspondence with air injectors produced and arranged according to the known art;

Figure 5A:
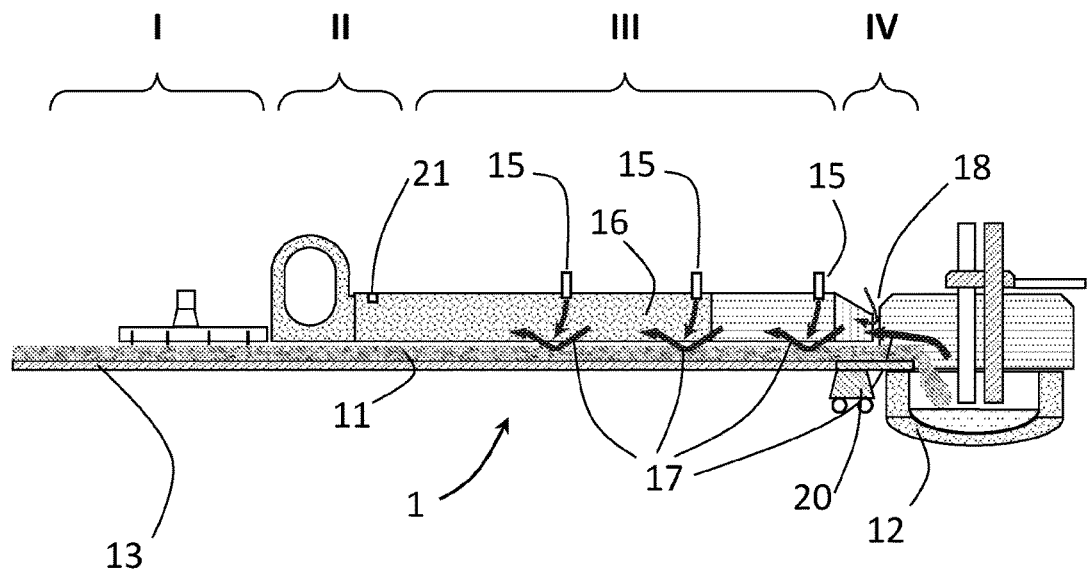
FIGS. 5a and 5b illustrates a plant according to the present invention.

With reference to the figures, FIGS. 1-3 illustrate three plants produced according to the known art, in particular, FIG. 1 illustrates a traditional plant with a preheating tunnel without gas injectors; FIG. 2 illustrates a plant with air injectors produced and arranged in the preheating tunnel according to the known art; FIG. 3 illustrates a plant with a heating and preheating section, with burners, connected by a suction/evacuation section of the fumes.

In the figures, 1 indicates as a whole a plant for continuously feeding a metal charge of scrap 11 to an Electric Arc Furnace (EAF) 12 in which a bath of molten metal is present in the liquid state.

In these configurations, the flow 17 of fumes coming from the furnace 12 follows a substantially linear path, which tends to be aligned with the walls of the preheating tunnel, thus moving away from the metal charge 11. Analogously, in the configuration of FIG. 2, with the combustion air injectors 19, the flow 17 does not undergo significant deviations, as the infiltrations of cold air 18, which take place at the interface between the furnace 12 and the tunnel, are substantially sufficient for completing the combustion of the fumes 17 coming from the furnace 12, so that the additional combustion air introduced through the injectors 10 according to the teachings of the prior art is extremely limited and is not capable of generating a significant turbulence.

The nozzles or injectors provided in the plant of the prior art do not have any specific spatial arrangement and are therefore not characterized by the specific spatial arrangement in the pre-heating tunnel described according to the present invention.

A plant 1 of this type is described for example in U.S. Pat. No. 5,183,143.

The plant 1 comprises at least one horizontal conveyor 13 suitable for continuously moving the metal charge of scrap 11 forwards towards the electric melting furnace EAF 12, defining the respective continuous horizontal feeding line of the charge 11 to a charging area IV of the furnace itself 12.

As can be clearly seen from the drawings, the horizontal conveyor 13 forms the base of a preheating tunnel 16 of the metal charge of scrap 11.

More specifically, the plant 1 is composed of a preheating section III which introduces the metal charge of scrap 11 into the electric melting furnace EAF 12, from an evacuation section of the fumes II present in the plant 1, provided, considering the movement direction of the scrap 11, upstream of said preheating section III, and from a section I which receives the metal charge of scrap 11 with a conventional receiving system of the scrap 11.

The horizontal conveyor 13 conveys the metal charge of scrap 11 by oscillation and transfers it from the preheating section III to a movable terminal section, called "connecting car" 20, which introduces the scrap 11 into the electric melting furnace EAF 12.

According to the present invention, nozzles are present on the vault of the tunnel of the preheating section III (preheating tunnel 16), for the injection of gas 15.

In particular, these are nozzles for the high-speed injection of gas 15.

Said nozzles 15 are distributed so as to obtain a certain turbulent swirling motion inside the preheating tunnel 16 to improve the heat exchange between the off-gases 17 and metal charge of scrap 11.

Figures 9A, 9B:
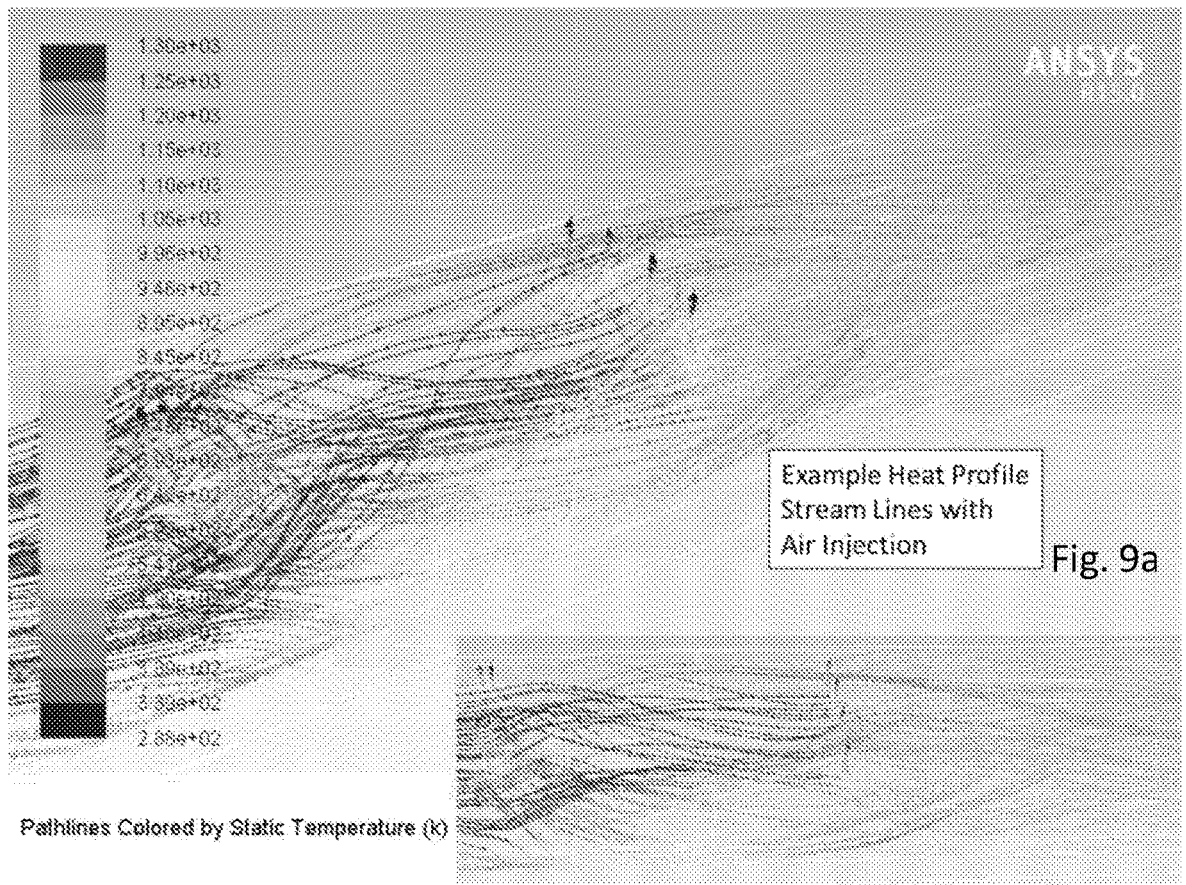
FIGS. 9a and 9b show the different flow of gases in a plant produced according to the present invention with the use of "fluid-dynamic turbulators" formed with high-speed jets.
Figure 10:
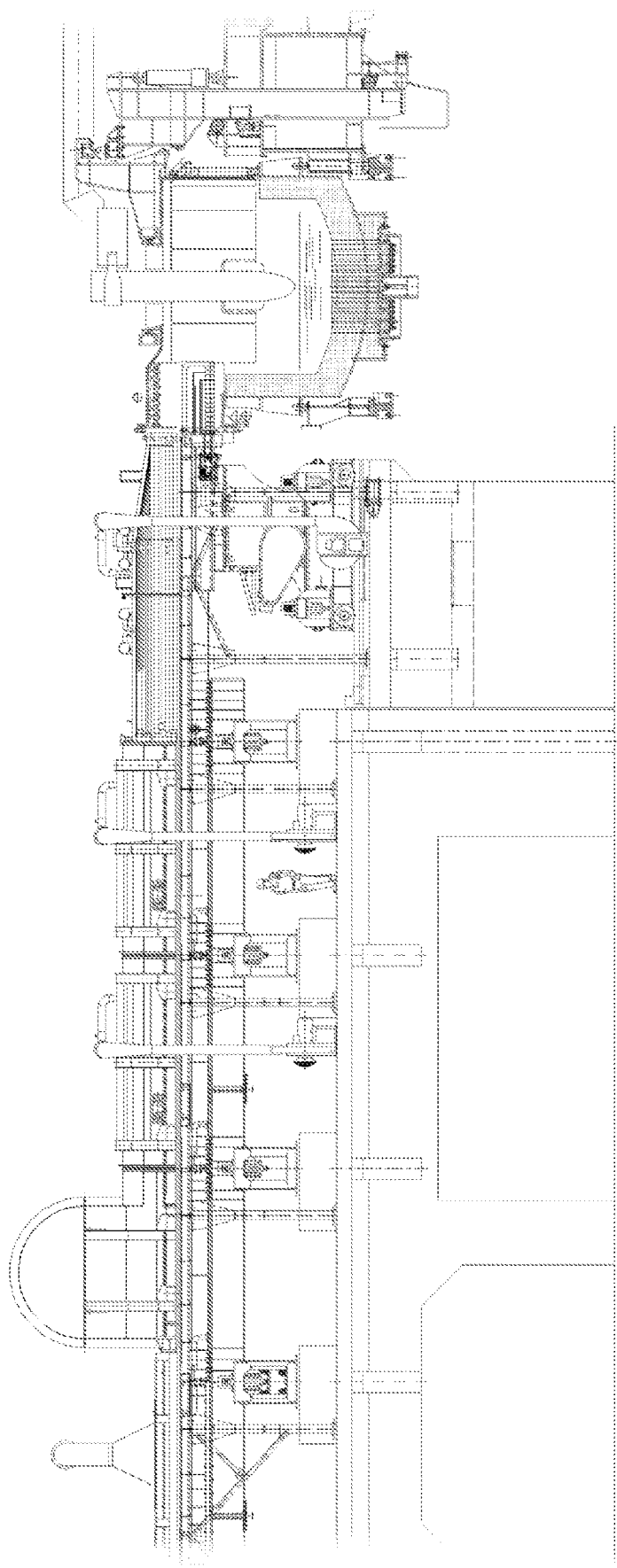
FIG. 10 illustrates a side view of the preheating tunnel with the nozzles provided in each section according to the present invention.

As illustrated in FIGS. 9a and 9b, the nozzles 15 provided on the vault of the tunnel 16 of the preheating section III increase the turbulence of the off-gases 17 and therefore allow the following to be obtained:

a higher mixing speed of the reagent gases and their combustion, improved conditions for the completion of the combustion of CO, $H_2$ and other gases and any carbonaceous particulate coming from the electric melting furnace EAF 12, a better and more uniform temperature distribution inside the preheating tunnel 16, a better heat exchange between the combustion gases and the metal charge 11 on the horizontal conveyor 13 inside the preheating tunnel 16.

In the plants of the known art not provided with said nozzles or "fluid-dynamic turbulators" 15, the air entering the plant through the connection portions is uncontrolled, and with a limited turbulence and vorticity, without obtaining an adequate mixing of the gases (FIGS. 4a, 4b and 4c), and therefore causing a slow and often incomplete combustion inside the preheating tunnel 16.

Thanks to the presence of the "fluid-dynamic turbulators" 15 inside the preheating tunnel 16, on the contrary, a greater mixing of the gases is obtained together with a higher flame intensity, which also serve to limit cooling due to the entry of air from outside the plant, in particular in the preheating tunnel 16.

Figure 7:
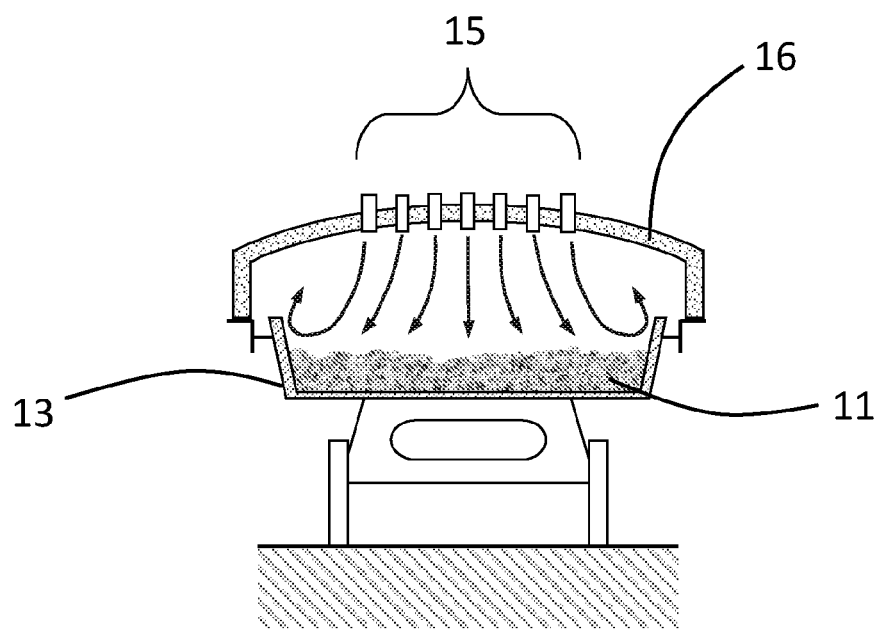
FIG. 7 illustrates the arrangement of the nozzles in a preheating tunnel of a plant according to the present invention.

As illustrated in FIGS. 7 and 9a, 9b, the arrangement of the nozzles or "fluid-dynamic turbulators" 15 allows the so-called downwash portion of the field of motion to be concentrated on the central portion of the horizontal conveyor 13, where the maximum heat exchange is therefore obtained between the metal charge 11 and the gases/fumes 17 present in the preheating tunnel 16.

In order to obtain the above-mentioned whirling-motion configuration, the nozzles 15, and therefore the incoming jets, are distributed transversely on the vault of the preheating tunnel 16 in a non-uniform manner with a greater concentration on the top of the vault of the tunnel 16.

In a preferred embodiment, in the transverse direction, the nozzles are positioned in the central part of the vault of the tunnel, with the side parts of the vault left without nozzles.

The arrangement of the gas jets is therefore such as to obtain a well-defined whirling structure (FIGS. 9a, 9b) inside the preheating tunnel 16, characterized by:

a descending flow area in the central area, immediately downstream of the section in which the nozzles 15 are present, in order to increase the heat exchange with the metal charge of scrap 11 in this area, ascending areas on the sides, to limit the heat exchange with the walls of the preheating tunnel 16 and horizontal conveyor 13.

This whirling structure of the gases in the preheating tunnel 16 is commonly called a "horseshoe vortex" and is obtained, according to an embodiment of the present invention, by arranging the nozzles 15, and therefore the jets, over about ⅔ of the cross section of the preheating tunnel 16, leaving the two side walls, close to the side walls of the vault of said tunnel 16, free.

Figure 8:
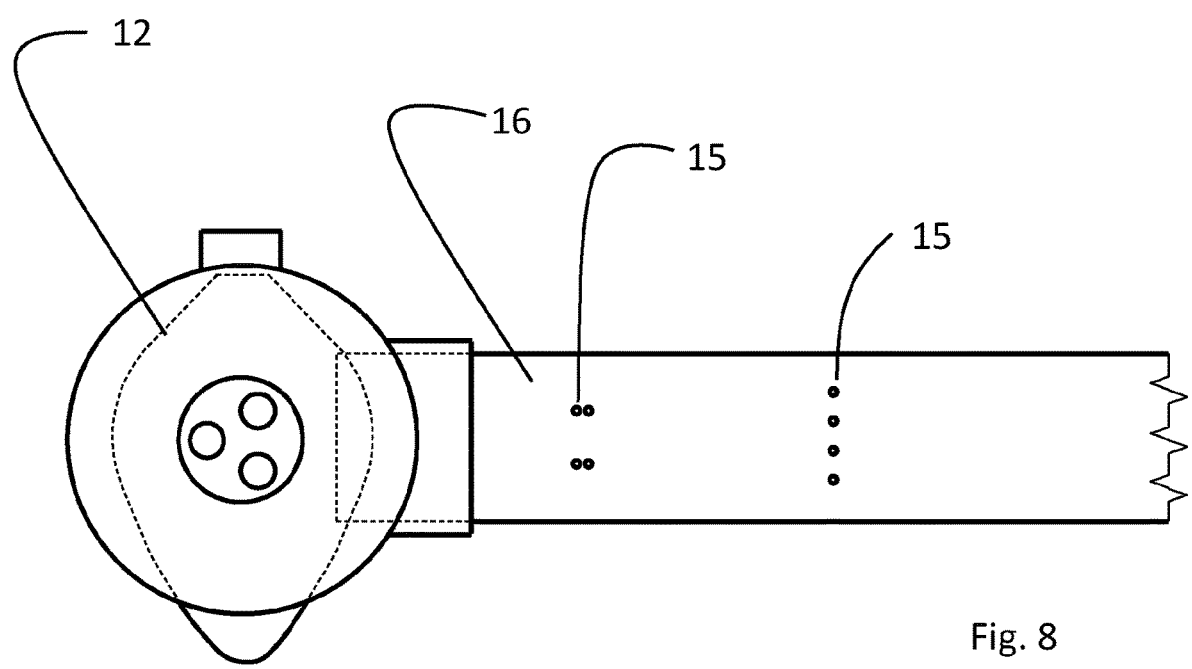
FIG. 8 illustrates the arrangement of the nozzles in a preheating tunnel of a plant according to the present invention.

The arrangement of the nozzles on the vault of the preheating tunnel 16 can vary in relation to the specific plant-engineering problems (see for example the embodiment solution shown in FIG. 8), however the requirement that the relative high-speed jets always intercept the central portion of the flow of off-gases 17, remains fixed, leaving the side portions free and thus favouring the establishment of an upward circulation of the gases and the formation of a horseshoe whirling motion in the entrainment flow.

The high-speed jets that act as "fluid-dynamic turbulators" are not uniformly distributed longitudinally on the vault of the preheating tunnel 16, but according to "injection sections" adequately spaced apart from each other, so as to avoid fluid-dynamic interference phenomena; the distance between two adjacent injection sections should be 4-6 m depending on the velocity of the gases passing through the preheating tunnel. The space between two adjacent injection sections serves to allow the high-intensity flame produced by the section upstream to have time to develop before being pushed towards the charge by the injection section immediately downstream.

In order to exploit the length of the preheating tunnel 16 as much as possible for completing the combustion of the CO and $H_2$ and any possible pollutants present therein in the process gases and improving the heat recovery, the first injection section is positioned as close as possible to the electric melting furnace EAF 12.

The first group of fast gas jets is provided close to the electric melting furnace 12, within a distance of 7-10 metres from the same.

Gas jets are provided at increasing velocities and/or flow-rates between subsequent "gas injection sections". The number of injection sections varies from two to four, depending on the quantity of combustible gas produced by the melting process under consideration.

Figure 11:
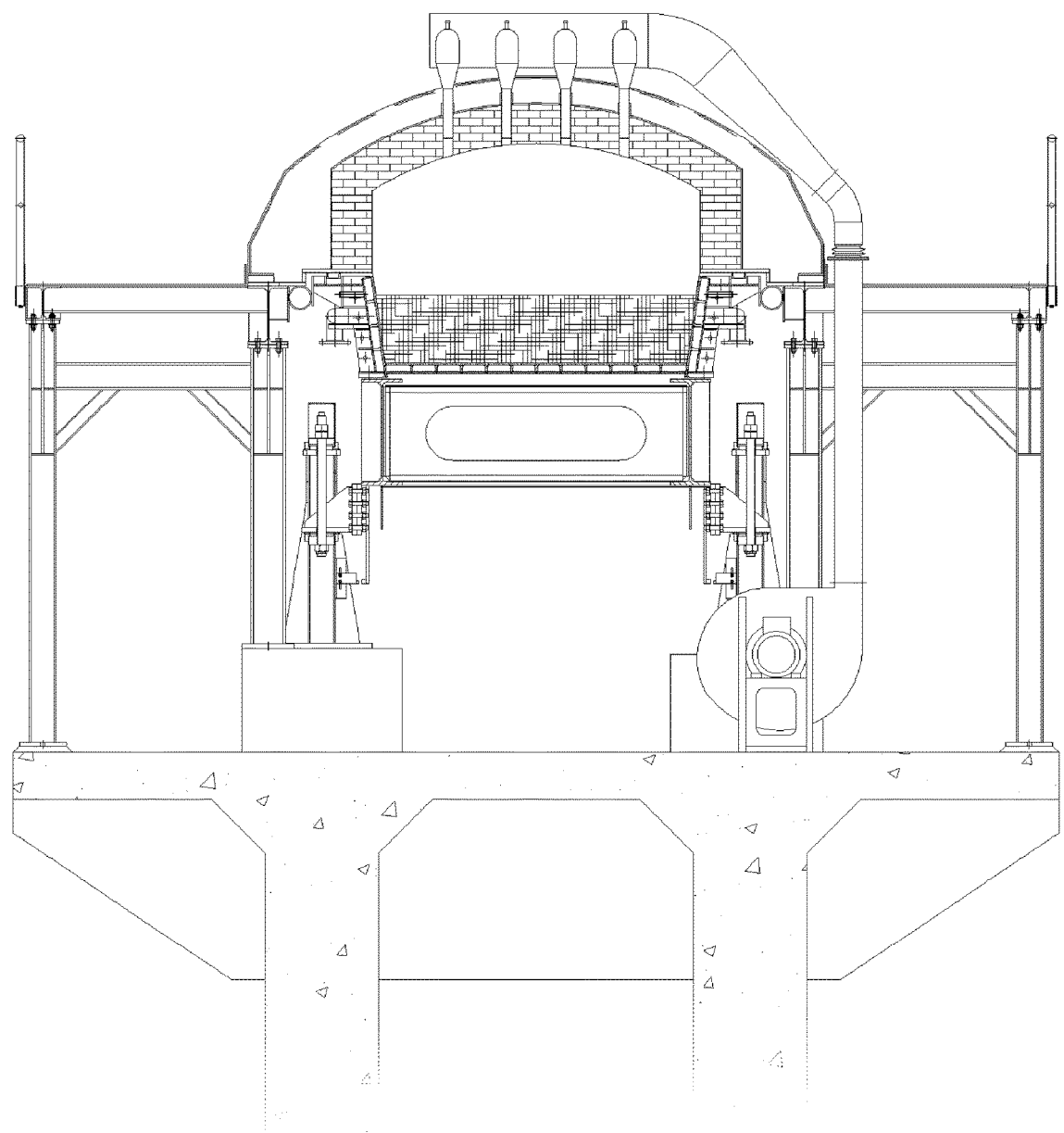
FIG. 11 illustrates, in a cross-section, a portion of the preheating tunnel with the nozzles provided according to the present invention.
Figure 12:
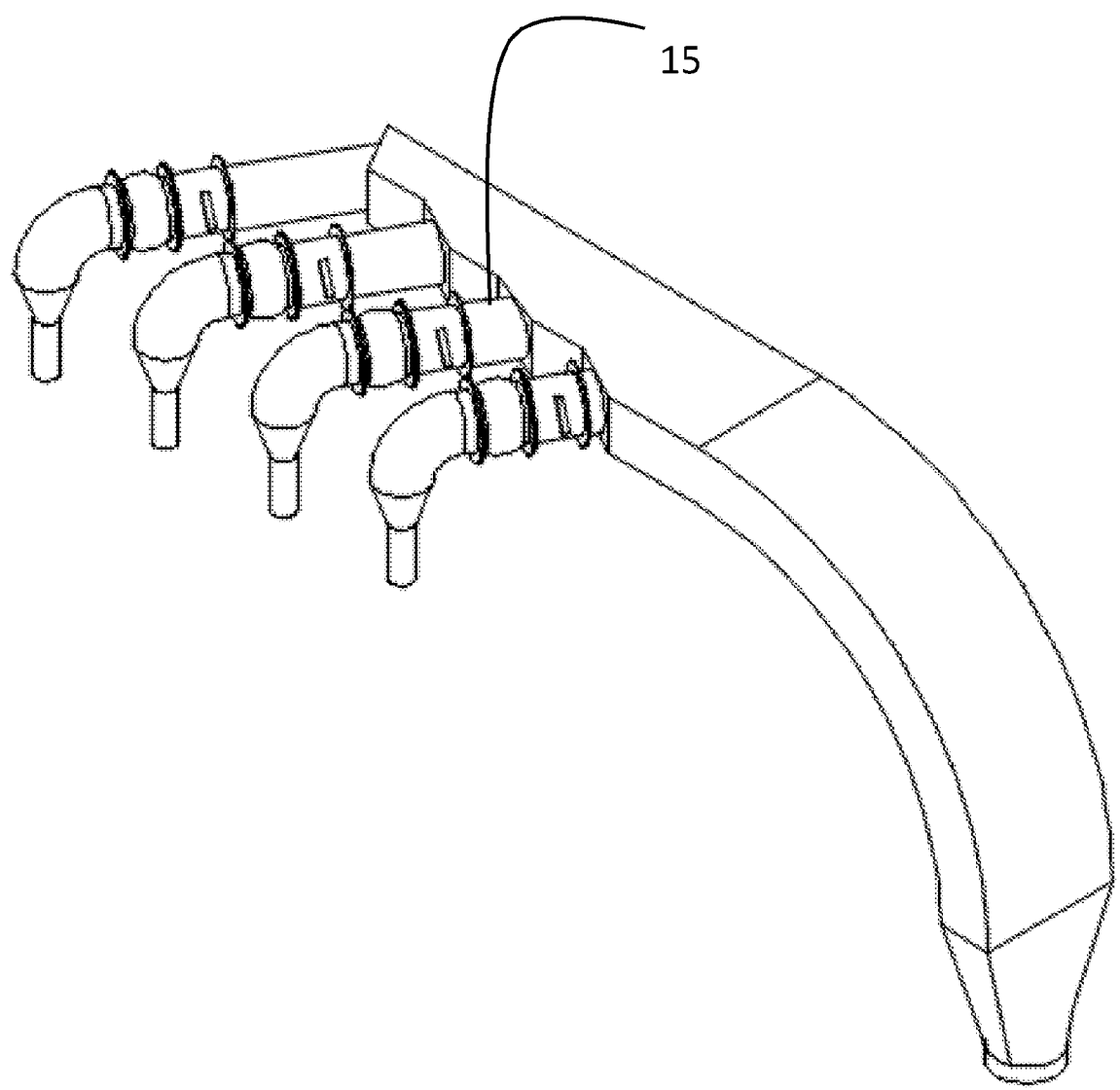
FIG. 12 illustrates a group of nozzles, according to the present invention, that can be positioned in a section of the preheating tunnel.

As illustrated in FIG. 11, starting from the electric melting furnace EAF 12 and following the flow of gases towards the fume suction plant (gas flow opposite to the movement direction of the metal charge 11), the plurality of nozzles 15 forming the first injection section can be provided above the connecting car 20 (first water-cooled hood) whereas the nozzles 15 forming the other injection sections can be arranged at the beginning of each segment of the refractory section of the preheating tunnel 16 (refractory lined hood).

In the example illustrated, the use is provided of three injection sections each composed of four nozzles 15.

The injected gas is generally air at room temperature, but it can also be another gas or mixture of gases, and the gas used can also be preheated.

Control means of the operating conditions of the nozzles 15 can be provided in each section.

The jets released from the nozzles 15 are small and fast as they must be capable of providing both a mixing action and also deviate the stream of gas passing through the preheating tunnel 16, activating the "downwash" motion of the hot gases 17 towards the metal charge 11, arriving with a velocity sufficient for penetrating the interstices of the material (the so-called "impingement" effect, as can be seen in FIG. 5, where the flow of hot gases 17 is pushed downwards towards the metal charge 11), thus improving the convective heat exchange.

This effect is obtained by assessing the flow-rate conditions and velocity of the gas flows involved in the process in question: defining impulse of a fluid stream as the product between mass flow-rate and velocity of the stream itself, the single jet must be dimensioned in such a way that the set of jets has an impulse similar to the impulse of the main stream of fumes that are passing along the tunnel 16 from the furnace 12 to the suction plant.

The dimensioning condition is therefore the following:

$$\frac{W_{gas} \cdot V_{gas}}{N_{jets} \cdot (W_{jet} \cdot V_{jet})} \approx 1$$

Wherein:
$W_{gas}$=mass flow-rate of the fumes in the tunnel in a given injection section [kg/s]
$W_{jet}$=mass flow-rate of the single jet in the same injection section [kg/s]
$V_{gas}$=velocity of the fumes in the tunnel in correspondence with the same injection section [m/s]
$V_{jet}$=velocity of the single jet [m/s]
$N_{jets}$=number of jets on the given injection section [#]

For purely illustrative purposes, in the application described, considering the injection of air at room temperature, this condition is normally obtained with jets having a flow-rate of around 1,000 $Nm^3/h$ and a discharge rate ranging from 85 to 105 m/s.

Within the technical solution proposed, due to the gas injected, a progressive increase in the flow-rate of gas passing through the preheating tunnel 16, is produced, this is why it may be necessary to consider jets with a greater impulse for the injection sections positioned further away from the furnace 12.

Following the flow of gases leaving the melting furnace 12 and entering the preheating tunnel 16, there is the provision that the first injection sections use lower flow-rates and velocities than the subsequent injection sections, due to the overall increasing flow-rate of the gas passing through the preheating tunnel.

Each injection section can be managed, controlled and regulated independently of the others, depending on the progress of the process and characteristics of the charge 11 present in the preheating tunnel 16 and gases 17 leaving the furnace.

In the simplest embodiment, the nozzles 15 are all the same and arranged on the top of the preheating tunnel 16 and their number basically depends on the width of the preheating tunnel itself, considering an availability of about ⅔ of the central portion (where the "downwash" area is to be established) with a distance between each jet of about 450-500 mm. In order to obtain an effective impingement effect, the top of the preheating tunnel 16 must be positioned at a distance of around 800-1,200 mm from the charge present in the conveyor (if the present invention is applied to an existing plant, this may require a redesigning of the preheating tunnel). In the case of particular configurations of the preheating tunnel 16, for example in the presence of plant constraints that do not allow the nozzles 15 to remain at the same distance from each other, a different arrangement and dimensioning of the jets can be used for obtaining an equivalent fluid-dynamic effect.

Contrary to the known plants and processes wherein the air injection is linked to the control of the combustion process from a stoichiometric point of view, in the present invention, the jets of air or other gas are prevalently, if not exclusively, used for obtaining certain turbulence conditions inside the preheating tunnel 16.

Even in the commonest case of the use of air jets, the overall injection capacity of the system described is almost always lower than the flow-rate of air necessary for completing the combustion of the process gases 17 coming from the furnace 12, as the primary objective of the system described is to stabilize the turbulence; the control of the supply of combustion air of the process gases inside the preheating tunnel 16 is basically delegated to the modulation of the suction depression and width of the gap between the mouth of the preheating tunnel and the furnace (that can never be completely eliminated from a plant-engineering point of view). In this way, the injection of air as turbulence generator is significantly decoupled by the supply of environmental air for completing the combustion of the process gases.

More specifically, said decoupling is achieved as follows. In a first step, for example the start-up of the plant, the nozzles 15 are kept off, and the plant is put into operation, starting the melting processes in the EAF furnace. The fumes generated by the furnace are drawn along the preheating tunnel III through the evacuation section II, and the temperature of said fumes generated by the furnace is measured by means of one or more sensors 21 (positioned in the fume evacuation section II, or in other suitable areas of the fume system) and, if necessary, their chemical composition, in particular the content of oxygen and/or carbon monoxide, is analyzed. The complete combustion of CO is usually considered to have been reached when the temperature measured is maintained above 700° C., and when—if the chemical composition is also measured—the oxygen content is not less than 5% by volume.

These conditions are achieved by adjusting the suction plant, in particular by regulating the speed of the suction fans; furthermore, the position of the connecting car 20 can be regulated so as to increase or decrease the openings at the interface between the connecting car 20 and the furnace, respectively increasing or decreasing (with the same regulation of the suction system), the flow 18 of ambient air which is sucked through the above-mentioned openings due to the internal depression.

Figure 5B:
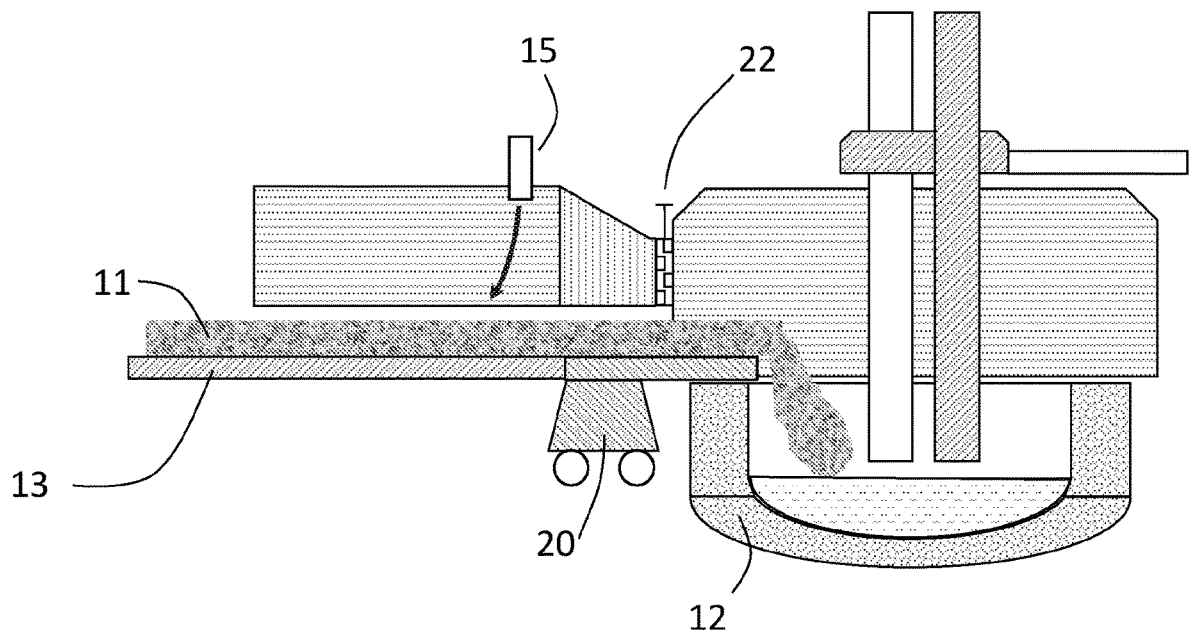
Figure 6:
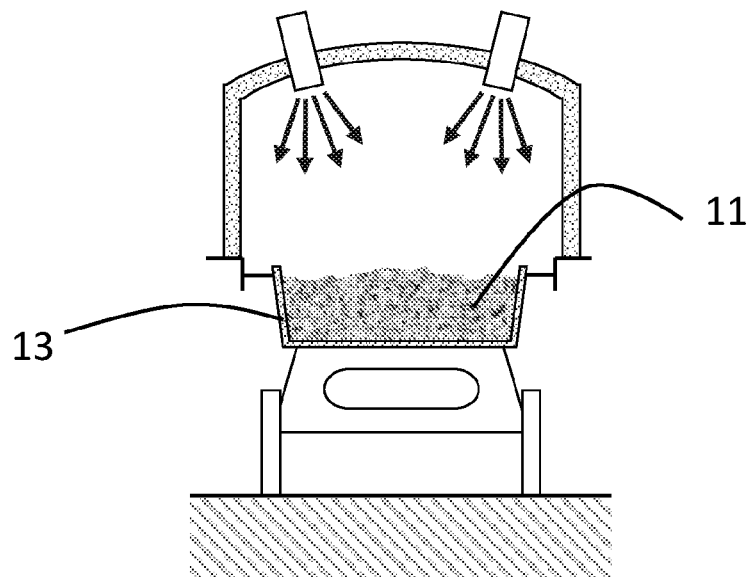
FIG. 6 illustrates the arrangement of the air injectors in a preheating tunnel of a plant according to the known art.

In addition, or as an alternative to regulating the position of the connecting car 20, an adjustable element 22 can be present (as shown in FIG. 5*b*) which allows the variation and adjustment of the opening at the interface between the connecting car 20 and the furnace; for example, this adjustable element 22 can be a connection flange with adjustable openings. Once the desired temperature conditions and possibly the chemical composition of the fumes have been reached, as indicated above, the plant is in safe conditions with respect to the combustion of the fumes.

At this point, the nozzles 15 are activated, which, as indicated, generate turbulence conditions that improve both the combustion of the fumes generated by the furnace and the heat exchange with the scrap 11. The air (or other gas or mixture of gases) injected through the nozzles 15 evidently does not play a significant role from the point of view of the chemical balance, as, on the basis of the procedure described, all the combustion air is drawn in through the openings of the preheating tunnel. The role of the air (or other gas or mixture of gases) injected through the nozzles 15 is, on the other hand, substantially of the fluid-dynamic type, as, by favouring the mixing of the fluid flow, it helps to develop a better combustion of the fumes.

As evidence of a role that is not linked to the chemical balance of the reaction, the quantity of air introduced through the nozzles 15 is normally around 5-15% of the quantity of air in the flow 18, i.e. the air drawn through the openings of the preheating tunnel.

The velocity of the air introduced by the nozzles 15 can therefore be easily regulated regardless of the requirements relating to the combustion of the fumes emitted by the electric melting furnace, said combustion being entrusted, as specified, to the air drawn in through the openings of the preheating tunnel. It is consequently possible to modulate the action of the nozzles 15 on the basis of other parameters, such as the type of process or the charge material, or any transients in the plant: for example, in the event of temporary stoppages of the conveyor, the air introduced by the nozzles 15 can be completely closed, in order to avoid local melting of the charge material, but at the same time ensuring the correct combustion of the fumes emitted by the furnace, which, as already indicated, is achieved by the air drawn in through the openings of the preheating tunnel.

The final objective of the present invention is therefore to increase the combustion intensity of the process gases coming from the furnace and the heat exchange between these and the charge, increasing the overall energy efficiency of the melting process.

The improved mixing and combustion of the process gases released from the furnace achieved by the application of the present invention, allows a better thermodestruction of the polluting substances (and relative precursors) present therein, to be obtained.

These multiple advantages are demonstrated by the results obtained experimentally, which show a saving of electric energy in the process equal to about 5-10 kWh/ton, and a reduction in the residual content of CO of up to 30%, in addition to a general reduction in other undesired elements such as VOC (volatile organic compounds), PAH (polycyclic aromatic hydrocarbons), PCBs (polychlorinated biphenyls), etc.

The present invention is also applicable to plants such as those described for example in document WO2012007105 provided with a preheating tunnel and a heating tunnel for the metal charge of scrap.

Thanks to the present invention, the heating of the charge of scrap is effected through a turbulence created in the preheating tunnel 16, unlike what takes place in the known plants in which the introduction of air is only effected in relation to the requirements of the chemical combustion process, without any management logic of the field of motion inside the preheating tunnel.

Thanks to the present invention, the use of deflectors inside the preheating tunnel 16 can also be avoided. These deflectors have disadvantages as they cause a significant pressure drop in the suction of the fumes, they require cooling and frequent maintenance operations as they operate within a flow of very hot and dusty gases (this not only represents a plant complication, but is also a source of the risk of leakages, causing a useless loss of thermal energy by the gases), they are difficult to regulate and manage from a practical point of view as it is not easy to change the incidence angle, and finally, their effect is limited when the velocity and therefore flow-rates to be treated are low.

The objectives of the invention mentioned in the preamble of the description have therefore been achieved.

The protection scope of the present invention is defined by the enclosed claims.

The invention claimed is:

1. A process for preheating a metal charge fed in continuous to an electric melting furnace through a preheating tunnel provided with side walls, a vault and horizontal conveyor, wherein said metal charge is enveloped in countercurrent by fumes or exhaust gases exiting from said electric melting furnace, said process comprising:

generating a turbulence that causes the fumes or exhaust gases, passing through the preheating tunnel and enveloping the metal charge, to penetrate the metal charge by causing a plurality of nozzles arranged on the vault of the preheating tunnel to eject jets of gas onto the fumes or exhaust gases;

causing an additional air intake into the preheating tunnel for completing a combustion of said fumes or exhaust gases, said additional air intake being from a surrounding environment through openings other than the plurality of nozzles along the preheating tunnel; and regulating said additional air intake being by acting on suction fans and/or on said openings, based on measurements provided by temperature sensors and/or a composition of outgoing gases located in a terminal part of said preheating tunnel or downstream of said terminal part.

2. The process according to claim 1, wherein the jets of gas released from said nozzles are distributed over about ⅔ of transverse sections of the preheating tunnel, leaving at least part of the side walls of the vault of said tunnel free of the nozzles.

3. The process according to claim 1, wherein a first group of the jets of gas is provided within a distance of 7 meters from the electric melting furnace.

4. The process according to claim 1, wherein the jets of gas are jets of gas having an increasing velocity and/or flow-rate between successive sections provided with said nozzles, thereby forming gas-injection sections.

5. The process according to claim 1, wherein a single jet of a nozzle is dimensioned so that a set of the jets has an impulse according to the following condition:

$$\frac{W_{gas} \cdot V_{gas}}{N_{jets} \cdot (W_{jet} \cdot V_{jet})} \approx 1$$

wherein:

$W_{gas}$=mass flow-rate of the fumes in the preheating tunnel in a given injection section [kg/s], $W_{jet}$=mass flow-rate of the single jet in a same injection section [kg/s], $V_{gas}$=velocity of the fumes in the preheating tunnel in correspondence with the same injection section [m/s], $V_{jet}$=single jet velocity [m/s], $N_{jets}$=number of the jets on the given injection section.

6. The process according to claim 1, wherein having a plurality of nozzles arranged on the vault of the preheating tunnel comprises having the plurality of nozzles arranged in a plurality of groups, which are positioned in a central portion of the vault and spaced longitudinally from one another by sections of the preheating tunnel having no nozzles.

7. A plant for implementing a process for preheating a metal charge fed in continuous to an electric melting furnace through a preheating tunnel provided with side walls, a vault and a horizontal conveyor, wherein said metal charge is enveloped in countercurrent by fumes or exhaust gases exiting from said electric melting furnace and by jets of gas ejected by a plurality of nozzles arranged on the vault of said preheating tunnel, said plant comprising:

suction fans, and openings other than the plurality of nozzles, arranged along the preheating tunnel, said fans and/or said openings being adjustable for sucking air from a surrounding environment to obtain a condition of complete combustion of said fumes or exhaust gases, said condition being verified based on measurements by temperature sensors and/or on composition of outgoing gases at a terminal part of said preheating tunnel or downstream of said terminal part, wherein at least two groups of said nozzles are provided on the vault of said preheating tunnel, spaced apart in a longitudinal direction with respect to the preheating tunnel, and wherein said nozzles are non-uniformly distributed longitudinally along said preheating tunnel.

8. The plant according to claim 7, wherein said nozzles are distributed over about ⅔ of transverse sections of the preheating tunnel, leaving at least part of the side walls of said preheating tunnel free.

9. The plant according to claim 7, wherein the preheating tunnel has 2 to 4 sections provided with said nozzles to define gas-injection sections spaced approximately 4-6 meters from each other in a longitudinal direction with respect to the preheating tunnel.

10. The plant according to claim 9, wherein a first one of the gas-injection sections is provided within a distance of 7 meters from the electric melting furnace.

11. The plant according to claim 9, wherein there are three gas-injection sections provided along the preheating tunnel, with four nozzles per transverse section.

12. The plant according to claim 9, wherein the nozzles are positioned and configured to provide jets of gas having an increasing velocity and/or flow-rate between successive gas-injection sections.

13. The plant according to claim 7, wherein the nozzles are all identical and arranged on a top portion of the vault of the preheating tunnel in a number depending on a width of the preheating tunnel, with a center distance of approximately 450 mm between each jet.

14. The plant according to claim 7, wherein said nozzles are non-uniformly distributed transversely on the vault of the preheating tunnel, with a greater concentration on a top of the vault of the preheating tunnel, and wherein transverse sections, along which the nozzles are distributed, are spaced longitudinally from one another by sections of the preheating tunnel having no nozzles.

* * * * *